United States Patent
Das et al.

(10) Patent No.: US 10,579,637 B2
(45) Date of Patent: Mar. 3, 2020

(54) SENSOR DATA GENERATION AND RESPONSE HANDLING STACK

(71) Applicant: Accenture Global Solutions Limited, Dublin (IE)

(72) Inventors: Jagaran Das, Kolkata (IN); Nirmalya Chakraborty, Kanchrapara (IN); Teresa Sheausan Tung, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 190 days.

(21) Appl. No.: 15/783,829

(22) Filed: Oct. 13, 2017

(65) Prior Publication Data

US 2018/0144034 A1 May 24, 2018

(30) Foreign Application Priority Data

Nov. 18, 2016 (IN) .............................. 201641039345

(51) Int. Cl.
*G06F 16/25* (2019.01)
*H04L 29/08* (2006.01)
(Continued)

(52) U.S. Cl.
CPC ............ *G06F 16/25* (2019.01); *G06F 3/0481* (2013.01); *G06F 15/7842* (2013.01);
(Continued)

(58) Field of Classification Search
CPC .................................................. G06F 3/0481
See application file for complete search history.

(56) References Cited

U.S. PATENT DOCUMENTS

2003/0097230 A1 5/2003 Garabedian
2005/0234691 A1\* 10/2005 Singh ..................... G06Q 10/04
703/11
(Continued)

FOREIGN PATENT DOCUMENTS

EP 0781451 12/2001

OTHER PUBLICATIONS

PMML Examples, Data Mining Group, Jul. 6, 2015, http://dmg.org/pmml/pmml_examples/index.html#Iris, captured Oct. 13, 2017.
(Continued)

*Primary Examiner* — Hosain T Alam
*Assistant Examiner* — Anthony G Gemignani
(74) *Attorney, Agent, or Firm* — Brinks Gilson & Lione

(57) ABSTRACT

A data generation stack executing on data processing circuitry may generate substitute data for provision in place of data sample from sensor circuitry. A configuration layer of the data generation stack may store a configuration file. A data ingestion and generation layer of the data generation stack may access the configuration file to determine static relationships among different sensors within the system. The data ingestion and generation layer may further determine dynamic relationships among the sensors. Based on a hybrid relationship that accounts for the static and dynamic relationships, the data ingestion and generation layer may generate substitute data for a sensor based on sampled data from another sensor. A data export layer of the data generation stack may access the generated substitute data for output.

20 Claims, 7 Drawing Sheets

(51) Int. Cl.
*G06F 3/0481* (2013.01)
*G06F 15/78* (2006.01)
*H04W 84/18* (2009.01)

(52) U.S. Cl.
CPC .......... *H04L 67/12* (2013.01); *H04L 67/2823* (2013.01); *H04W 84/18* (2013.01)

(56) References Cited

U.S. PATENT DOCUMENTS

| | | | | |
|---|---|---|---|---|
| 2014/0026474 | A1* | 1/2014 | Kulas | A01G 22/00 47/1.7 |
| 2016/0110975 | A1* | 4/2016 | Oppenheimer | G06F 21/50 340/572.1 |
| 2016/0270289 | A1* | 9/2016 | Schildroth | A01C 21/007 |
| 2016/0282156 | A1 | 9/2016 | Ott et al. | |
| 2016/0282514 | A1* | 9/2016 | Moran | G01W 1/02 |

OTHER PUBLICATIONS

What is PFA for?, Data Mining Group, http://dmg.org/pfa/docs/motivation/, archived Jan. 19, 2016, at https://web.archive.org/web/20160119152141/http://dmg.org/pfa/docs/motivation/, captured Oct. 13, 2017.

European Patent Office, Extended European Search Report from European Patent Application No. 17196771.4 dated Feb. 21, 2018, pp. 1-12.

Horsburgh et al., "A sensor network for high frequency estimation of water quality constituent fluxes using surrogates," Environmental Modelling & Software, Elsevier, Amsterdam, NL, vol. 25, No. 9, dated Sep. 1, 2010, pp. 1031-1044.

Phillip et al., "DrOPS: Model-Driven Optimization for Public Sensing Systems,", 2013 IEEE International Conference on Pervasive Computing and Communications (PERCOM), San Diego, USA, IEEE, dated Mar. 18, 2013, pp. 185-192.

Australia Patent Office, Examination Report No. 1 for Australia Patent Application No. 2017248402 dated Feb. 8, 2018, pp. 1-6.

Hall et al., An Introduction to Multisensor Data Fusion, Proceedings of the IEEE, vol. 85, No. 1, Jan. 1997. [retrieved from Internet on Mar. 6, 2018] <URL:https://www.researchgate.net/profile/Ju_Hu5/publication/258743232_Multifunction_Simulator_for_Radar_Test/links/58527ebc08ae95fd8e1d45a2/Multifunction-Simulator-for-Radar-Test.pdf >.

European Patent Office, Extended European Search Report from European Patent Application No. 19159807.7 dated Apr. 3, 2019, pp. 1-11.

European Patent Office, European Search Report from European Patent Application No. 17196771.4 dated Mar. 13, 2019, pp. 1-13.

* cited by examiner

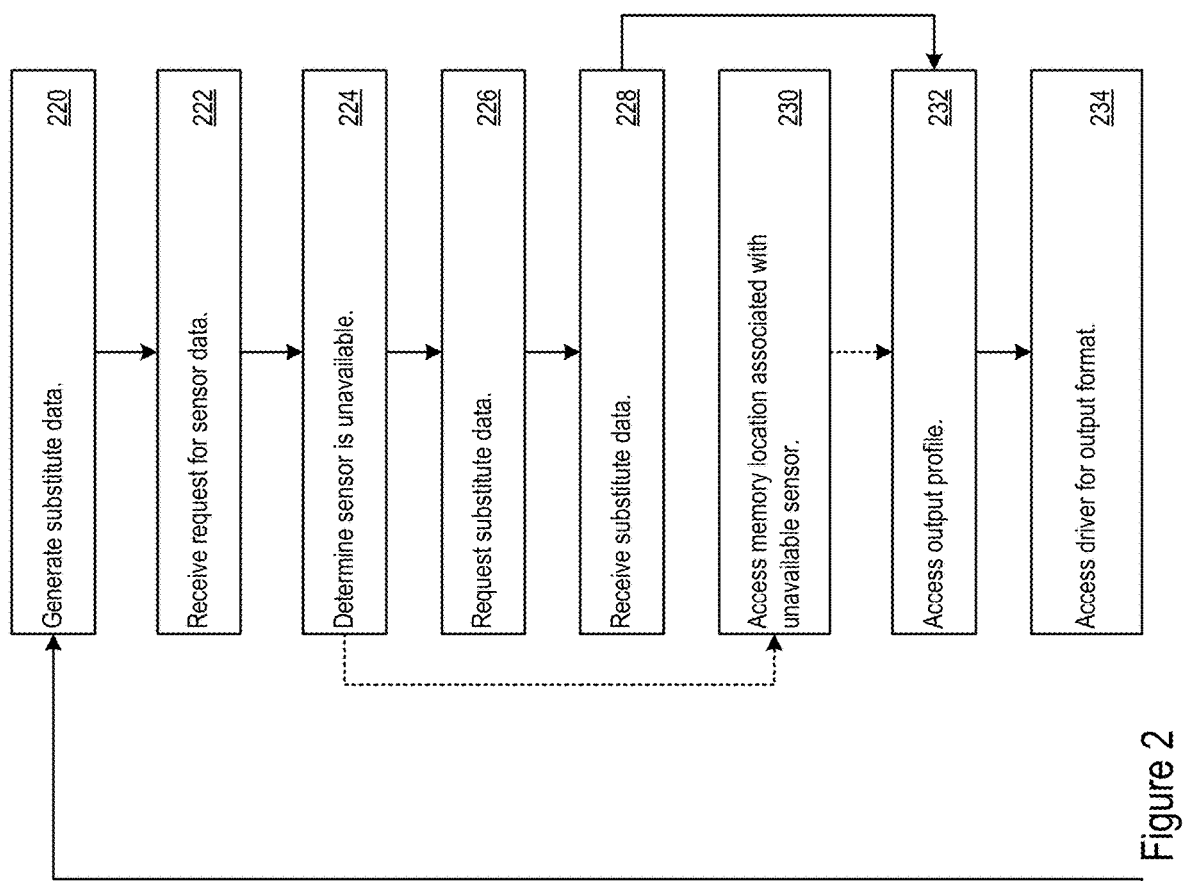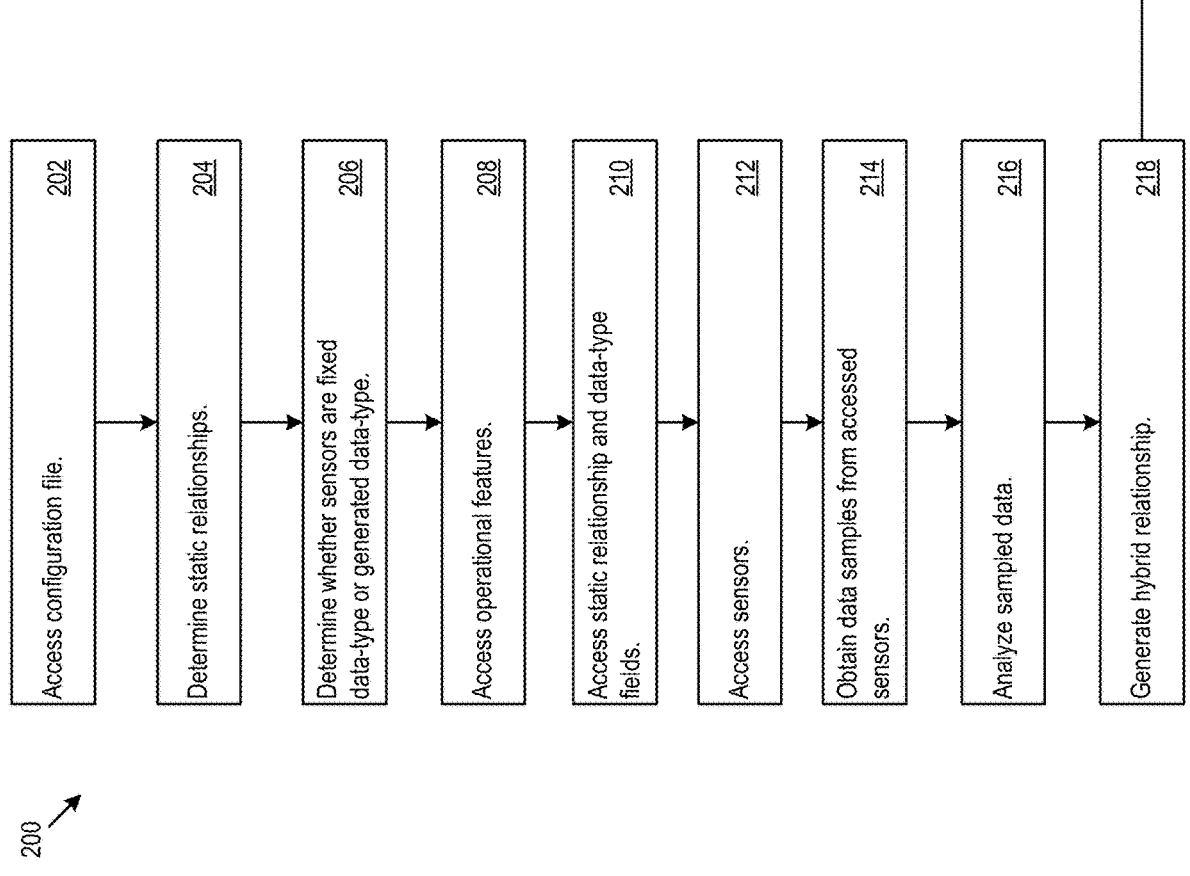
Figure 2

SENSOR DATA GENERATION AND RESPONSE HANDLING STACK

PRIORITY CLAIM

This application claims priority to, and incorporates by reference in its entirety, Indian Patent Application Serial No. 201641039345, filed Nov. 18, 2016.

TECHNICAL FIELD

This disclosure relates to sensor data generation.

BACKGROUND

Rapid advances in communications and sensor technologies, driven by immense customer demand, have resulted in widespread adoption of networked data sensors of virtually every type and cloud systems for remote data collection, analysis, and reporting of the sensor data. As just one example, home temperature sensors may report to a centralized climate control system responsible for adjusting temperature throughout the home. Improvements in communication and sensor data reliability will further enhance the capabilities of networked sensor systems.

BRIEF DESCRIPTION OF THE DRAWINGS

FIG. 2 shows data generation and response handling logic.

DETAILED DESCRIPTION

Figure 1:
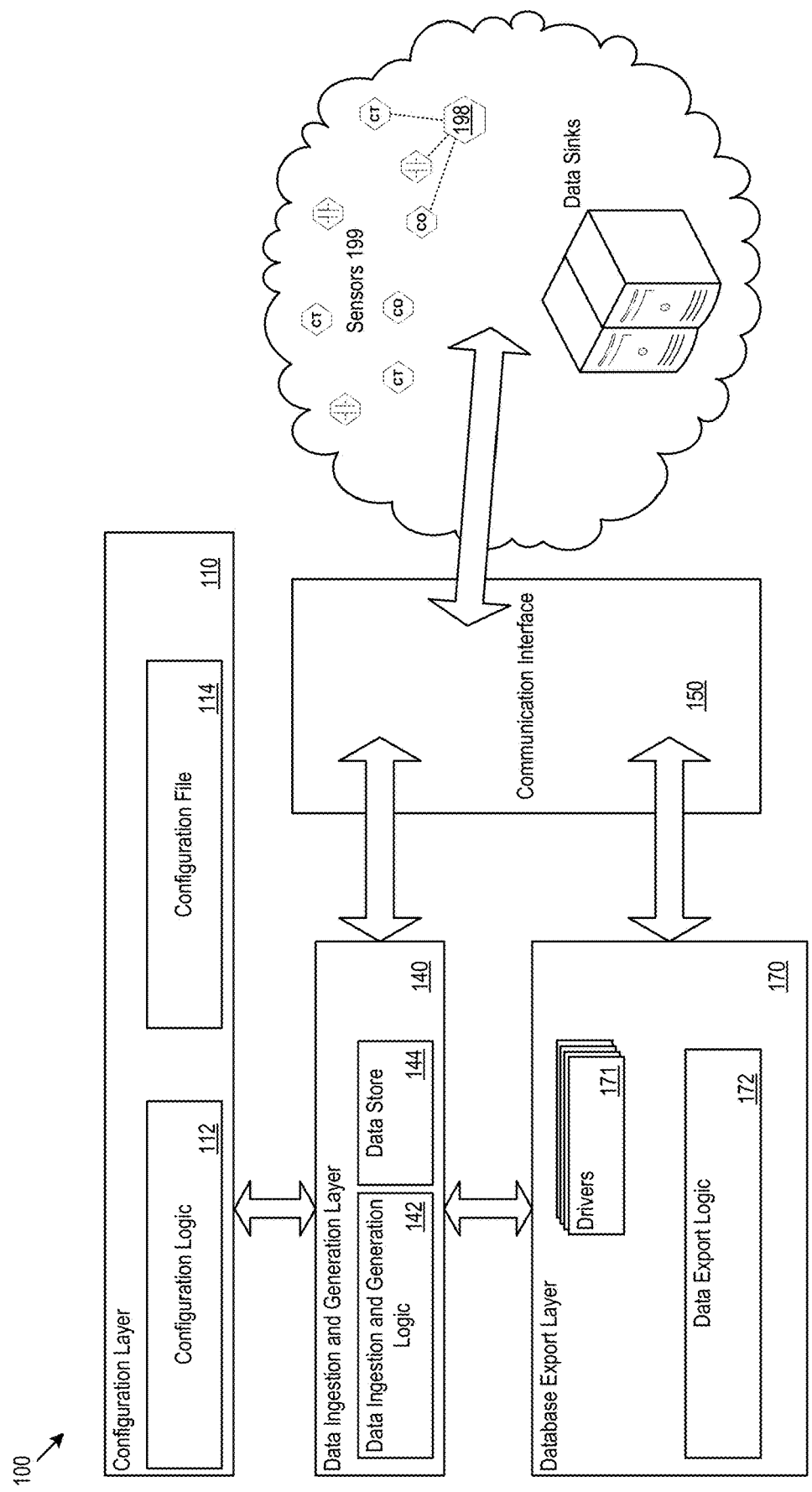
FIG. 1 shows an example multiple layer data generation and response handling stack.

Network connected sensors may monitor various natural phenomena and systems. The network connected sensors, such as Internet of Things (IoT) sensors, may send measured values to a processing system. The processing system may store the measured sensor data within databases or other repositories, process the data to perform monitoring or management functions, respond to requests for the data from external systems, host the data, or perform other data processing activities. In some cases, a request may arise for sensor data from a sensor of any particular sensor-type that is unavailable at the time of the request. For example, a sensor of the requested sensor-type may be out of service, not installed, out of range, damaged, non-existent, or otherwise unavailable.

In various scenarios, the techniques and architectures discussed below allow the processing system to generate substitute data to serve as sensor data from the unavailable sensor type. The generated substitute data may be generated using static, dynamic, or hybrid relationships between the data type of the unavailable sensor and one or more data types of available sensors. Therefore, in some circumstances unavailable sensor data of a given type may be replaced by the generated sensor data to answer the request. That is, the processing system may provide the generated data as if it were obtained from the unavailable sensor.

In various systems, a component may request data from a specific sensor that may be unavailable. The requesting component may not necessarily be configured to accept data from another sensor type or a different sensor of the same type. Hence, the unavailability of the specific sensor may result in reduced operation or non-operation of the requesting component. Component downtime may lead to reduced overall performance of a system. Hence, a processing system that facilitates data substitution for unavailable sensors may improve the overall operation of the underlying hardware of a computer system, at least in terms of its fault tolerance, as well as the continued operation of downstream systems that rely on the operation of the requesting component. The multiple layer data generation stack discussed below provides an architecture that facilitates such sensor data substitution, thereby improving the operation of the underlying hardware.

In addition, in various industries, monitoring or other sensor activities may serve a central role. For example, for public utilities, healthcare, automotive operation, agriculture, and other industries, monitoring facilitates proper and efficient provisioning of resources. Sensor unavailability may lead to poorly timed or placed resource deployment, failure to properly direct gas or electricity flow in public utilities, and other problems. In industries, such as those mentioned above, where improperly timed or placed resources may lead to failures, such as, plant down-time, or missed harvest windows, providing substitutes for unavailable sensors may assist in preventing such failures. As a result, the techniques and architectures described below lead to significant savings from loss avoidance and increased uptime.

The discussion makes below makes reference to FIG. 1 which shows an example multiple-layer data generation stack 100, and FIG. 2 which shows corresponding data generation and response handling logic 200, which may be implemented by the data generation stack 100. In this example, the data generation stack 100 includes a configuration layer 110, a data ingestion and generation layer 140, and a data export layer 170.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the data generation stack 100, the data ingestion and generation layer 140 may provide the data export layer 170 with access to stored sensor data within a database. Hence, the data ingestion and generation layer 140 may provide a hardware resource, e.g., database memory access, to the data export layer 170.

The configuration layer 110 may include configuration logic 112 which may access a configuration file 114 to determine sensor availability, type, location, access protocols, or other operational features of various connected sensors 199 (202). The configuration file may be stored in various formats, including YAML (Yet Another Markup Language), JSON (JavaScript Object Notation) or other formats. The configuration file 114 may further define static relationships among available sensors and unavailable sensors. For example, the configuration file 114 may define a relationship among multiple available sensors in anticipation of potential future unavailability of one more of the sensors. Additionally or alternatively, the configuration file may define a relationship between one or more available sensors and an unavailable sensor. For example, the configuration file 114 may include such a relationship in anticipation of the data generation stack 100 servicing data requests for data from a non-existent, damaged, disabled, or otherwise unavailable sensor instead of denying such requests. Accordingly, the configuration logic 112 may access the configuration file 114 to determine static relationships among sensors (204).

The static relationships defined within the configuration file 114 may include specific structural components. For example, the structural component may be a fixed mapping between the unavailable sensor. Further, in some cases, the structural component may comprise a mathematical structure, such as, a defined equation or system of equations. Additionally or alternatively, the structural component may be a hardware resource designator that identifies hardware and may designate hardware resources used to generate substitute data for a particular sensor, for example, a sensor determined to be unavailable. For example, the configuration file 114 may define a structural static relationship by designating multiple available sensors that may be sampled in tandem to generate substitute data for another unavailable sensor.

Additionally or alternatively, the configuration file 114 may include independent variable fields that indicate which sensors provide data that is representative of an independent variable within the data generation system. The data provided by these sensors may not necessarily be substituted through data generation by the data generation stack 100. For example, these sensors may always be classified as fixed data-type sensors. Accordingly, the data ingestion logic 142 may not necessarily dedicate computing resources to attempt to determine relationships for generating substitute data for these sensors.

Further, the configuration file 114 may comprise dependent variable fields which may indicate which sensors for which output may always be generated. For example, non-existent sensors may not be queried for data. Accordingly, data for non-existent sensors may always be generated rather than directly sampled from a physical sensor. Any selected non-existent sensors may be configured within the configuration file 114 as generated data-type sensors.

Other sensor data may be generated some of the time and fixed during other periods. For example, a connected sensor may experience a transient power interruption. The data generation stack 100 may detect the non-responsiveness of the sensor resulting from the power interruption. For example, the data ingestion and generation layer 142 may query a power status sensor 198 or other status sensor for one or more to the sensors 199 and request a status update from a non-responsive sensor. In some cases, the power status sensor 198 may have a battery backup system to allow for status reporting after a power failure or other system failure. During the transient power interruption, the data generation and response handling stack 100 may provide substitute data to service requests for data from the sensor. When the sensor powers up once again, the data generation and response handling stack 100 may revert to providing data sampled from the sensor itself. For example, data ingestion and generation layer 142 may receive a report from a power status sensor 198 that the sensor in question has powered up once again. Additionally or alternatively, the sensor may simply resume streaming data after the service interruption ends. Upon reestablishment of the stream, the data ingestion and generation layer 142 may cease replacing the data of the sensor with substitute data. The configuration logic 112 may access the configuration file to determine whether particular sensors are fixed data-type or generated data-type sensors (206).

The data ingestion and generation layer 140 may include data ingestion logic 142. The data ingestion logic 142 may preform data processing and machine learning to facilitate the sensor data generation. The data ingestion and generation layer 140 may further couple to a communication interface 150. The data ingestion logic 142 may access operational features for various sensors from the configuration logic 112 at the configuration layer 110 (208). For example, operational features may include data refresh rates, sample rates, data formats, access protocols, security features or other operational features for one or more sensors. The data ingestion logic 142 may also access static relationships and data-type for various sensors (210) from the configuration file 114.

The data ingestion logic 142 may also determine dynamic relationships among sensors. For example, the data ingestion logic 142 may determine dynamic relationships among sensor outputs based on sampled data from the sensors instead of pre-established mathematical relationships or other structural relationships. To determine dynamic relationships, the data ingestion logic 142 may access one or more sensors, for example, through the communication interface 150 or via data request (212). The data ingestion logic 142 may obtain a data sample from the one or more accessed sensors (214). Dynamic relationships may be used when static relationships stored within configuration file 114 are incomplete, unavailable, unable to represent transient components within data relationships, or other circumstances where a stored relationship may not necessarily represent a current relationship.

The data ingestion logic 142 may then analyze the sampled data from the one or more access sensors to determine a dynamic relationship (216). For example, the data ingestion logic 142 may apply a mathematical regression to a data sample obtain for a first sensor. The data ingestion logic 142 may then attempt to reverse generate data for another sensor from which the data ingestion logic 142 has a second sample. Reverse generation may include a technique by which generated data is used as an input to an inverted data generation relationship. Accordingly, data that would normally be relationship input data, for example independent variable data, may be generated. The reverse generated data may be used to check the accuracy of a relationship. If the reverse generated data differs significantly from data sampled directly from sensor circuitry, the relationship may be inaccurate and may be checked by the system. By comparing the generated data with the sampled data, the data ingestion logic may determine a dynamic relationship between the two sensors. Additionally or alternatively, the data ingestion logic 142 may test a dynamic relationship by comparing generated data for a sensor with other generated data for that same sensor that was generated through another route. This comparison may be implemented by comparing the two sets of generated data directly or by reverse generating the sensor data used to generate one of the sets of generated data with the other set of generated data. In various implementations, the dynamic relationship may be determined by determining an error component within a corresponding static relationship by comparing data generated using a static relationship to sampled data obtained from a sensor.

In some cases, the data ingestion and generation logic 142 may implement models tailored to a specific data generation scenario in place of or to supplement variable-purpose statistical models. Variable purpose statistical models may include models useful in a wide variety of fields such as linear or polynomial regressions. Models tailored to a specific data generation scenario may include analytical and statistical models that assume a set for or other set of assumptions that assist in generating a relationship more quickly. For example, a growth pattern data generator may use a specific analytical model known to relate soil humidity to growth. In another scenario, a temperature data generator may rely on the black-body radiator equation to generate temperature data from an available spectral sensor. In another example, humidity data generation may rely on regional (for example, Asia-Pacific regional data) seasonal precipitation data. The models used may be altered based on configuration or in response to more recent data dynamic relationship data. An operator may incorporate custom models by incorporating the models into the configuration file 114.

In some cases, where real-time sampled data may be unavailable for a given sensor, the dynamic relationship may be determined or tested using historical data. For example, cached data for two different types of sensors may be used to test a dynamic relationship. The cached data from a first of the two sensors, for example car acceleration sensor data, may be used to generate the substitute cached data from the second of the two sensors, for example, engine heat data. The substitute cached data may be compared to the actual cached data to determine accuracy. The dynamic relationship itself may be determined from analysis, such as trend tracking, of the real-time data sampled from the first of the two sensors, e.g., the car acceleration sensor data.

Once the dynamic relationship is determined, the data ingestion logic 142 may combine the static and dynamic relationships to generate a hybrid relationship (218). In some implementations, the hybrid relationship may be generated using pre-defined weights within the configuration file. Alternatively or additionally, the hybrid relationship may be determined based on the analysis used to generate the dynamic relationship. For example, the balance between the dynamic and static relationships may be determined by comparisons with reverse generated data. In systems where the dynamic relationship is determined as an error component of the corresponding static relationship, no further adjustment of the dynamic relationship may be necessary because the dynamic relationship was determined responsive to the static relationship. Additionally or alternatively, in some cases, a final relationship, e.g., hybrid relationship, may be determined purely from a dynamic component or purely from a static component. In some operational modes of the data generation and response handling stack, relationships may be entirely static, entirely dynamic, or a mix of entirely static and entirely dynamic relationships. The mode of operation may be specified within the configuration file 114. For example, a hybrid relationship may be established using weights defined within the configuration file 114. In the example, a dynamic relationship, such as a linear regression determined by statistically comparing data sampled from available hardware sensors may be paired with a static relationship represented by an analytic equation. The analytic equation may represent the relationship of two variables to within a known error due to temporal factors that may not necessarily be known a priori. The linear regression may be used as a correction to the analytic equation. The defined weights may be used to balance the two (dynamic and static) components. For example the linear regression may have limited overall accuracy due to sample size and sample duration. Accordingly, rather than using the dynamic relationship as the only component it may be used to make a correction to static relationship. The combined end result may be the hybrid relationship.

Once the hybrid relationship is determined, the data ingestion logic 142 may generate substitute data for a sensor (220). Data generation may begin once a final relationship is determined. In some cases, substitute data generation for one sensor may commence while relationships for other sensors are still being calculated. The substitute data may be generated continuously or continually or may be generated aperiodically, e.g., responsive to a request or when pre-defined conditions are met. The generated substitute sensor data may be treat the same or similarly to actual sampled sensor data. In some cases, the substitute sensor data may be stored or achieved in a database as if it were data obtained directly from sensor circuitry. As discussed below, the substitute sensor data may be streamed or otherwise provided in response to sensor data requests. In some cases, obfuscation of the source of the substitute sensor data may serve to increase confidence in the substitute data and better facilitate uninterrupted operation of systems dependent on data from a particular sensor.

Nevertheless, in various implementations, the substitute data may be clearly marked as substitute data. For example, meta data for substitute data may include a substitute data identifier field. Marking substitute data may help to avoid inadvertently leading an operator into mistaking substitute data for data sampled directly from a hardware sensor. Identifying substitute data may speed response times in correcting sensor hardware failures by alerting operators of the use of substitute data and giving the operators incentive to investigate the reason for substitute data reliance.

The data export layer 170 may include data export logic 172 which may be coupled to the data ingestion and generation layer 140 and the communication interface 150.

The data export logic 172 may receive a request for sensor data through the communication interface 150 (222). The requested sensor data may be from a particular sensor or type of sensor that is unavailable to service the request. The data export logic 172 may determine that the particular sensor or type of sensor is unavailable (224). The data export logic 172 may send a request for substitute sensor data to the data ingestion logic 142 (226). The data ingestion logic 142 may respond with generated substitute data (228). Alternatively, the data export logic 172 may determine that despite the unavailability of the particular sensor or type of sensor, substitute sensor data is still stored in a data store 144 for that sensor. Accordingly, the data export logic 172 may access the substitute sensor data in the data store for the particular sensor (230) rather the sending a request to the data ingestion and generation layer 140. The data export layer may access an output profile for the request within the configuration file 114 (232).

Different requests may be serviced using different output formats for output to different data sinks. For example, requests may be serviced by generating a flat file containing substitute data, streaming substitute data, pushing substitute data to an edge device, providing access to the substitute data as a web service, populating a relational database with the substitute data, or providing substitute data in another output format. To comply with the formatting requirements the data export layer may establish any number of pre-defined output drivers 171 for any pre-determined output formats (234). Any particular driver 171 may include any combination of software instructions and hardware resources that facilitate data formatting, conversion, and provisioning of substitute data in a particular output format. The software instructions pointers to network resources, format profiles, or other instructions that may be used in distribution or translation of the substitute data. The software instructions may define the actions taken to perform data and protocol translations. The hardware resources may include, for example, network access, processor runtime, and other resources, that may be used to effect format translations and file transfers.

Figure 3:
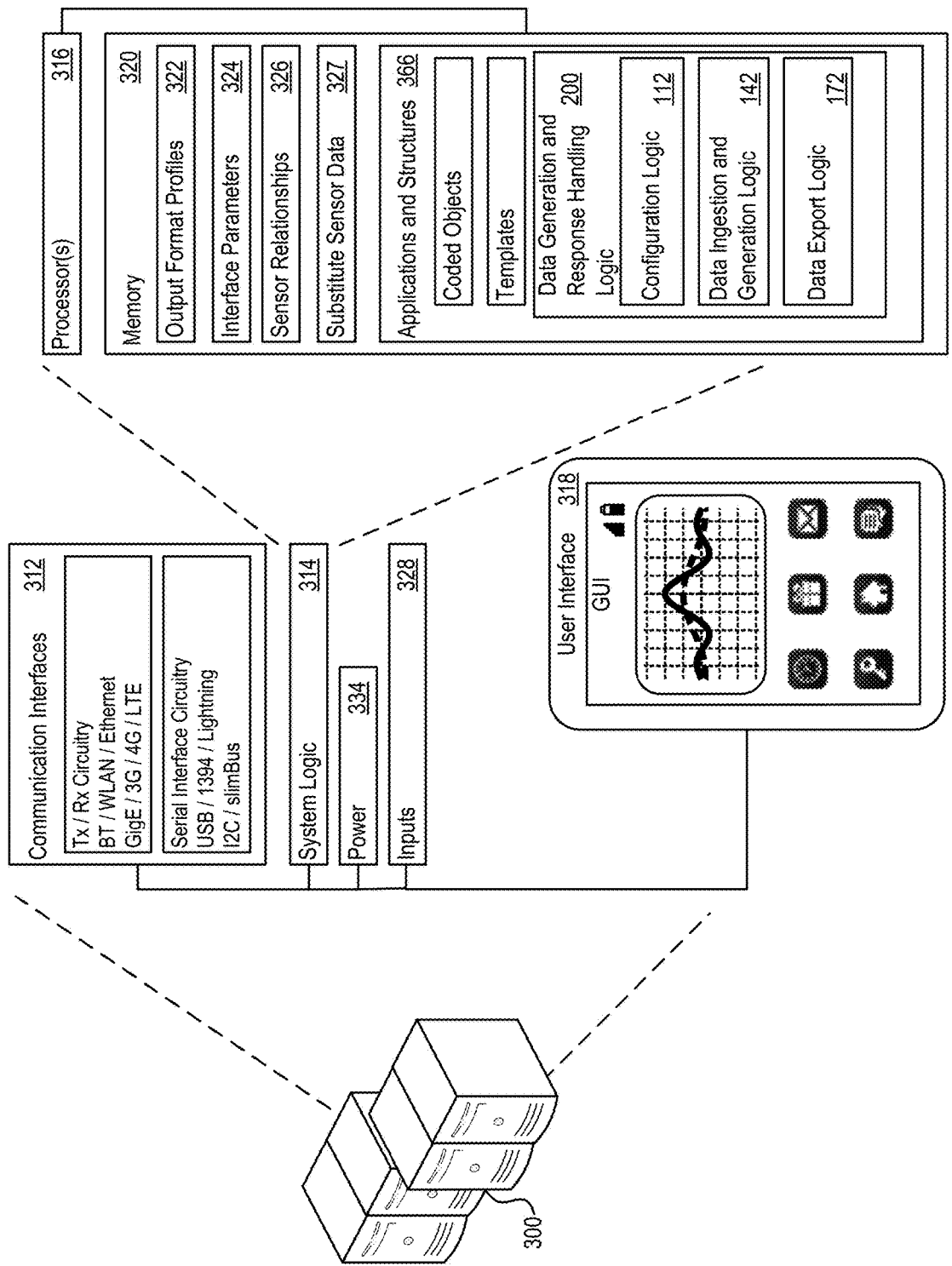
FIG. 3 shows an example specific execution environment for the data generation stack.

FIG. 3 shows an example specific execution environment 300 for the data generation and response handling stack 100 described above. The execution environment 300 may include system logic 314 to support execution of the multiple layers of the data generation and response handling stack 100 described above. The system logic may include processors 316, memory 320, and/or other circuitry.

The memory 320 may be used to store the configuration file 114, output format profiles 322, communication interface parameters 324, sensor relationships (e.g. dynamic and hybrid relationships) 326, and substitute sensor data 328 as described above. In some cases, the memory 320, for example memory used for the substitute sensor data 327, may be implemented using a relational database management system (RDMS). The memory may further include applications and structures 366, for example, coded objects, templates, or other structures to support data analysis, data regression, and/or other data analysis or generation. The applications and structures may include the data generation and response handling logic 200, which therein may include the configuration logic 112, data ingestion logic 142, and the data export logic 172.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces may also include serial interfaces, such as universal serial bus (USB), serial ATA, IEEE 1394, lighting port, I²C, slim Bus, or other serial interfaces. The communication interface may support communication with sensor circuitry using one or more link types. The execution environment 300 may include power functions 334 and various input interfaces 328. The execution environment may also include a user interface 318 that may include human interface devices and/or graphical user interfaces (GUI). In various implementations, the system logic 314 may be distributed over multiple physical servers and/or be implemented as a virtual machine.

In some cases the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example the data generation and response handling stack, of the execution environment onto the hardware resources. In some cases, a manifest may be stored as a preference file such as a YAML (yet another mark-up language), .JSON, or other preference file type.

The discussion below describes example scenarios and implementations that may use the data generation and response handling stack 100 described above.

IoT capable sensors are becoming more widespread in their adoption in remote sensing applications and other sensing scenarios. Operators may use IoT sensors to remotely monitor particular systems and variables and may also use the IoT nodes as messaging relays for carrying out commands/instructions, such as actuator or system mode changes.

Apart from IoT applications, there are various devices and sensors available across various applications that may benefit from operational improvements resulting from high efficiency and high accuracy modeling.

In various implementations, the configuration layer of the data generation and response handling stack may use YAML based configuration files in LISP syntax.

Figure 4:
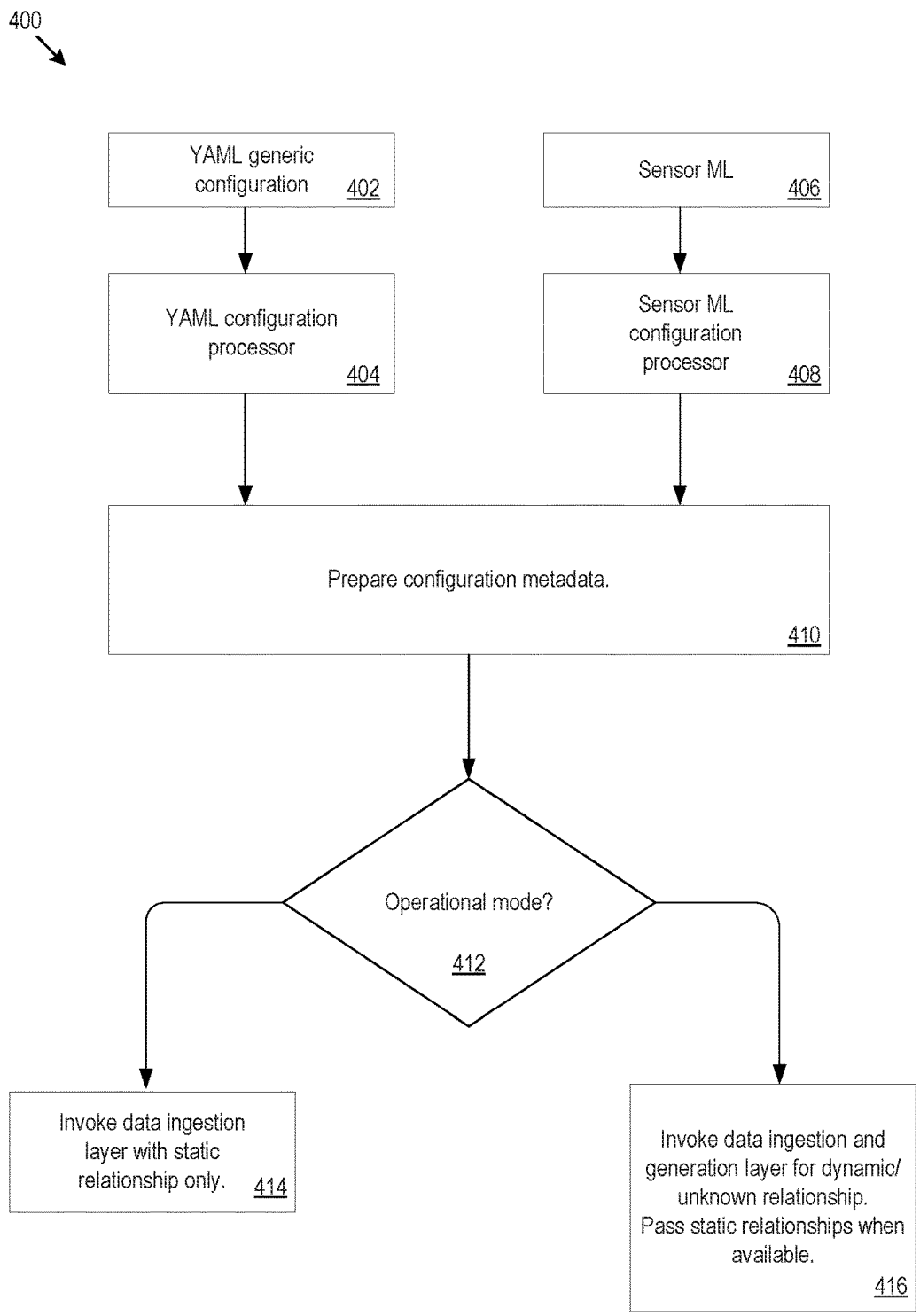
FIG. 4 shows example implementation of the configuration logic.

FIG. 4 shows an example implementation 400 of the configuration logic 112. The configuration logic 400 may access a YAML configuration filed (402). The YAML instructions and parameters stored within the configuration file may be parsed and interpreted by YAML configuration processing logic (404). The configuration logic may also access sensor circuitry via a sensor markup language (ML) syntax (406). The incoming sensor data may be processed by sensor ML configuration processing logic (408). The configuration logic 400 may also prepare metadata for attachment to sensor fixed and generated sensor data output (410). The configuration logic 400 may determine the operational mode of for the data ingestion logic (412). For operation in static only relationship modes, the configuration logic 400 may signal that data ingestion logic may operate without determination of dynamic relationships (414). Otherwise, the configuration logic 400 may send signals to cause the data ingestion logic to determine at least some dynamic relationships (416).

In various systems, the configuration logic 400 may be domain specific. For example, the configuration logic 400, for example, via the configuration file, may be particularized to specific application or group of applications. For example, the configuration file may specify sensor types that are specific to an application or group of applications. Further, the relationships among the sensors may be particularized to a specific application or enterprise.

Figure 5:
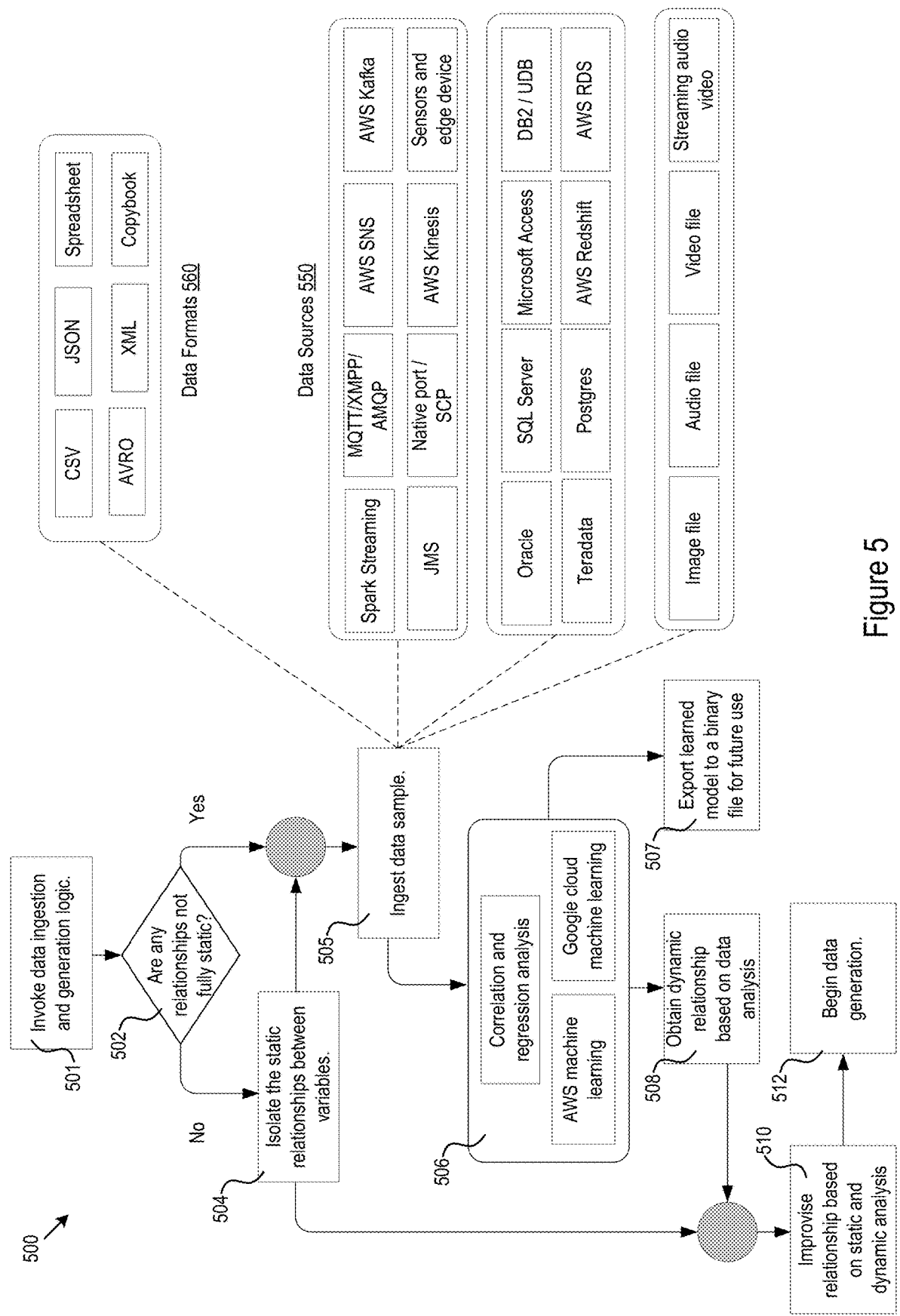
FIG. 5 shows an example implementation of the data ingestion logic.

FIG. 5 shows an example implementation 500 of the data ingestion logic 142. In some implementations, the data ingestion logic 500 may be used to collect historical data. The data ingestion logic 500 may apply machine learning algorithms to generate the relationships among independent and dependent variables. The data ingestion logic may be invoked by the configuration logic (501). To determine the relationships among the data types, the data ingestion logic 500 organizes the variables and cycles through them to capture relationships. The data ingestion logic 500 may identify the variables which are not dependent on any other input (502). The data ingestion logic 500 may determine which variables have a direct relationship, for example a relationship not mediated by another intermediate variable, with the variable that were determined to be independent (504). To determine relationships that are not static, the data ingestion logic 500 may ingest a data sample (505) from various data sources 550 in various formats 560. The data ingestion logic 500 may determine dynamic relationships (506) as described above with respect to data ingestion logic 142. The obtained dynamic relationships may be stored, e.g., in PMML, PFA, or other format files, for future use as static relationships within configuration files (507). Using the obtained dynamic relationships (508), the data ingestion logic may improvise hybrid relationships that are based on the static and dynamic relationships (510). Using the determined hybrid relationships, the data ingestion logic 500 may begin data generation (512). The data ingestion logic 500 may continue to map variables to ensure that mappings are obtained for each of the variables defined in the configuration file or otherwise present in the system. In some cases, the data ingestion logic 500 may access cloud based data mining and machine learning solutions such as those provided by Amazon Web Services (AWS), Google, or other enterprise data mining applications, to perform the relationship calculations.

The data ingestion logic 500 may operate in multiple modes, including a supervised/manual mode, a learning and discovery mode, and a mixed mode. In the supervised/manual mode, an operator may specify the relationship between the various input parameters for data generation and the system may proceed based on the relationship specified. For example, the user may specify a Predictive Model Markup Language (PMML) or Portable Format for Analytics (PFA) document specifying the relationships among variables and the system may generate data based on the specified relationships. In some cases, seed values may be supplied to supplement data gleaned from sensor measurement. In this mode static relationships may be specified and calculation of dynamic relationships may be foregone.

The PMML document may specify analytical algorithms and corresponding coefficients specifying the relationships among variables. For example, pseudo code below is an example PMML file that was generated after analyzing a dataset using a linear regression model. The same PMML may also be used generate the data in reverse. Table 1 below shows an example PMML document.

TABLE 1

Example PMML file.

```
<PMML                xmlns="http://www.dmg.org/PMML-3_2"
xmlns:xsi="http://www.w3.org/2001/XMLSchema-instance"
version="3.2" xsi:schemaLocation="http://www.dmg.org/PMML-3_2
http://www.dmg.org/v3-2/pmml-3-2.xsd">
<Header copyright="Copyright (c) 2012 DMG" description="Linear
Regression Model">
<Extension name="user" value="DMG" extender="Rattle/PMML"/>
<Application name="Rattle/PMML" version="1.2.29"/>
<Timestamp>2012-09-27 12:34:14</Timestamp>
</Header>
<DataDictionary numberOfFields="5">
<DataField    name="sepal_length"    optype="continuous"
dataType="double"/>
<DataField    name="sepal_width"    optype="continuous"
dataType="double"/>
<DataField    name="petal_length"    optype="continuous"
dataType="double"/>
<DataField    name="petal_width"    optype="continuous"
dataType="double"/>
<DataField    name="class"    optype="categorical"
dataType="string">
<Value value="Iris-setosa"/>
<Value value="Iris-versicolor"/>
<Value value="Iris-virginica"/>
</DataField>
</DataDictionary>
<RegressionModel    modelName="Linear_Regression_Model"
functionName="regression"    algorithmName="least    squares"
targetFieldName="sepal_length">
<MiningSchema>
<MiningField name="sepal_length" usageType="predicted"/>
<MiningField name="sepal_width" usageType="active"/>
<MiningField name="petal_length" usageType="active"/>
<MiningField name="petal_width" usageType="active"/>
<MiningField name="class" usageType="active"/>
</MiningSchema>
<RegressionTable intercept="2.17126629215507">
<NumericPredictor    name="sepal_width"    exponent="1"
coefficient="0.495888938388551"/>
<NumericPredictor    name="petal_length"    exponent="1"
coefficient="0.829243912234806"/>
<NumericPredictor    name="petal_width"    exponent="1"
coefficient="-0.315155173326474"/>
<CategoricalPredictor    name="class"    value="Iris-setosa"
coefficient="0"/>
<CategoricalPredictor    name="class"    value="Iris-versicolor"
coefficient="-0.723561957780729"/>
```

TABLE 1-continued

Example PMML file.

```
<CategoricalPredictor    name="class"    value="Iris-virginica"
coefficient="-1.02349781449083"/>
</RegressionTable>
</RegressionModel>
</PMML>
```

The data ingestion logic 500 may analyze the PMML values corresponding to sepal_length, sepal_width, petal_length and petal_width to score a class value for each record. The coefficients specified in the PMML file are generated using sampled data. The data generation phase operates in reverse of the relationship determination step. When generating data, the data ingestion logic 500, accepts the PMML document as an input and generates data based on the relationships defined in the PMML document.

PFA documents allow for a free form specification of analytical relationships. Using a text editor, an operation may edit a PFA that expresses data relationships in terms of equations. For example, Table 2, below, shows a data relationship stating the dependent variable Y with respect to input variable X.

TABLE 2

Example PFA file.

```
input: int
output: int
action:
    - { "+": [{"*": [
           "input",
           2
        ]}, 4]}
```

Accordingly, the pseudocode above fixes the relationship between X and the output Y using the following equation:

$$Y = mX + c \qquad \text{Equation 1}$$

where m=2 and C=4.

The data ingestion logic 500 may generate data by varying X as the input variable the output (Y) may be generated. In some cases, the output Y may serve as input for generation of another dependent variable, for example, Z.

Table 3 shows input/output for the relationship defined in the example PFA pseudocode:

TABLE 3

Example PFA input/output.

| | | |
|---|---|---|
| 1 | 1 | input (JSON) |
| 2 | 2 | |
| 3 | 3 | |
| 4 | 4 | |
| 5 | 5 | |
| 1 | input: int | PFA document |
| 2 | (YAML) | |
| 3 | output: int | |
| 4 | action: | |
| 5 | - {"+": [{"*": [ | |
| 6 | "input", | |
| 7 | 2 | |
| | ]}, 4]} | |
| 1 | 6 | output (TEXT) |
| 2 | 8 | |
| 3 | 10 | |
| 4 | 12 | |
| 5 | 14 | |

Moving now to the operation of the learning and discovery mode and mixed mode. In the learning and discovery mode, on operator may supply a data sample specifying and system may derive the relationships as discussed above with respect to dynamic relationship calculation. In this mode, the system may operate without a defined static relationship. Additionally or alternatively, the learning and discovery mode may be invoked by setting the relative weight of the static relationship to zero. Thus, even though a static relationship may be defined, the static relationship may not necessarily contribute to the generation of substitute data.

The mixed mode may use the hybrid relationship discussed above, where contributions from dynamic and static relationship calculations are combined to reach the operative result. Further, in the mixed mode, purely static or dynamic relationship may be used for different variable relationships. For example, in some cases, some variable relationships may be know a priori (either analytically or statistically), while other variable relationships may be unknown. Thus, dynamic relationships may be determined by the data ingestion logic 500 for the unknown relationships and the known relationships may be specified through static relationships defined in the configuration file. Once a dynamic relationship is determined the, data ingestion logic (e.g., 142 or 500) may capture the relationship within a configuration file (e.g., PRA, PMML, YAML or other format) for later use by the system or another system. Capturing and storing previously determined dynamic relationships may improve the overall operation of the underlying hardware of the system by obviating repeat calculations of dynamic relationships and reducing processing load.

Figure 6:
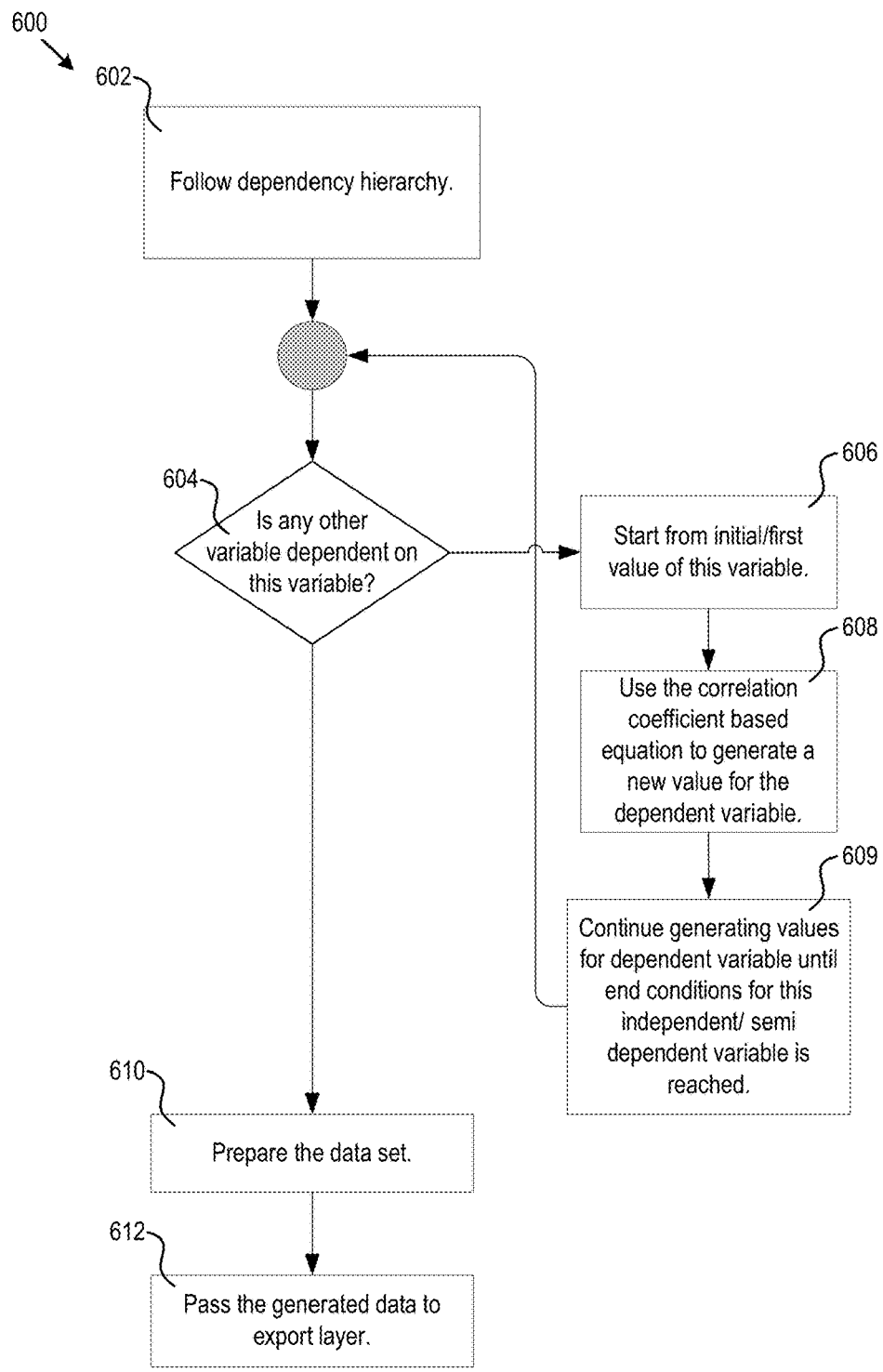
FIG. 6 shows an example implementation of the data generation portion of the data ingestion logic.

Once the relationships between variables are known, the data ingestion and generation layer may begin generating substitute data. FIG. 6 shows an example implementation 600 of the data generation portion of the data ingestion logic 142. The data ingestion logic 600 may follow a dependency hierarchy in generating data (602). For example, the data ingestion logic 600 may generate data for a first variable before generating data for variables dependent on that variable. In some implementations, the hierarchy may entail generating data for all variables at a given level before proceeding to the next level. Accordingly, in such a hierarchy all first level independent variables are generated before the data ingestion logic 500 proceeds to the second level dependent variables. In other hierarchies, the data ingestion logic may proceed directly to higher levels until the data ingestion logic 500 arrives at a first variable before data has been generated for a second variable from which the first depends. The data ingestion logic 500 may then move to that second variable. Other hierarchies may rely on priority assignments for data generation. In these hierarchies, the data ingestion logic may proceed to generate the highest priority data first. Where the highest priority data is dependent on other data, the data ingestion logic 500 may follow the shortest dependency route to the highest priority data. In various implementations using data generation priority, the configuration file may specify the priority values for data generation.

The data ingestion logic may determine whether any variables have remaining dependents for which data has not been generated (604). The data ingestion logic may begin data generation from an initial value for the given variable with a dependency (606). The initial value may be a first value in a time or data storage sequence or other initial value. The data ingestion logic 600 may generate values for the dependent variable (608). The data ingestion logic 600 may continue data generation until end conditions for the dependent variable are reached (609). For example, the end conditions may include generating the same number of entries for the dependent variable as exist for the base variable, reaching a value maximum, a time series maximum, or other end condition. The data ingestion logic 500 may prepare the data set (610). For example, the data ingestion logic 500 may send the generated data to the data export layer in real-time as it is generated. Additionally or alternative, the data ingestion logic 500 may aggregate related generated data into a final data set for provision to the data export layer. Once prepared, the data ingestion logic 500 may pass the generated data to the data export layer (612).

Figure 7:
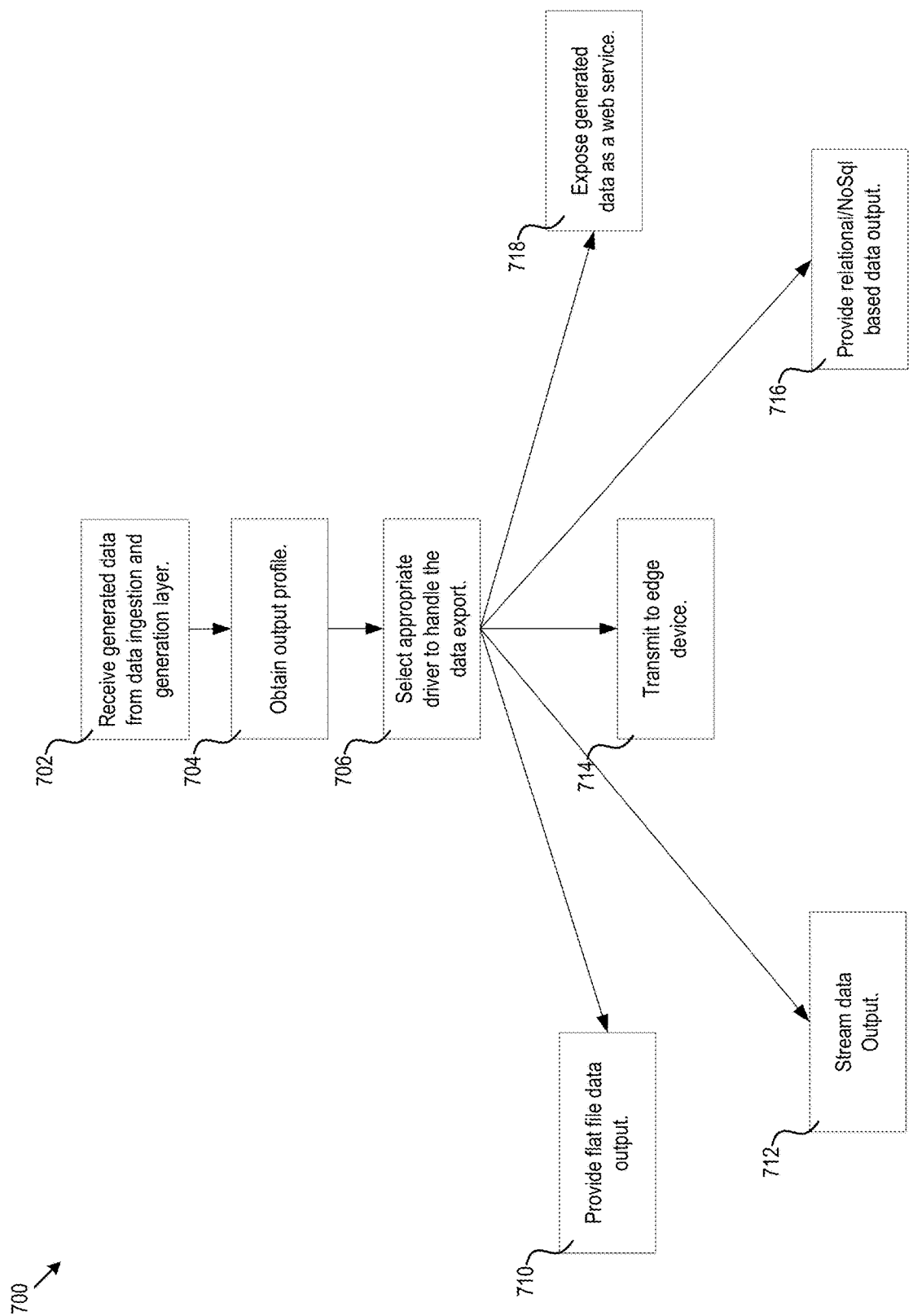
FIG. 7 shows an example implementation of the data export logic.

As discussed above, the generated substitute data may be distributed to other systems, such as requesting systems, by the data export logic 172. FIG. 7 shows an example implementation 700 of the data export logic 172. The data export logic 700 may receive generated data from the data ingestion and generation layer (702). The data export logic 700 may obtain output profiles (704) for various data sinks configured to receive the generated data. Based on the output profiles, the data output logic may select drivers to handle the data export (706). The data export layer may send the generated data to various data sinks including flat file storage (710), streaming output (712), edge device provision (714), relational database provision (716), and web service exposure (718). The output may also be formatted to JSON, XML, CSV and other formats thorough use corresponding drivers. In addition, generated substitute data may be formatted using various IoT protocols such as Message Queuing Telemetry Transport (MQTT), eXtensible Messaging and Presence Protocol (XMPP), Advanced Messaging Queuing Protocol (AMQP), or other IoT protocols, to facilitate the use of the generated substitute date as a replacement for actual sampled sensor data.

The format of the configuration file may differ among various implementations of the data generation and response handling stack. Table 4 shows an example annotated YAML configuration file format. However, other formats, including other YAML formats may be implemented.

TABLE 4

Example YAML Configuration File format.

| Parent Parameter | Parameter | Type of parameter | Purpose | Example Value |
|---|---|---|---|---|
| Output | name | Declaring an output location globally for this configuration file | This output location can be reused by its name as "target output repository" for one or multiple sensor configurations in the same configuration file. | COMBINED_OUTPUT |

TABLE 4-continued

Example YAML Configuration File format.

| Parent Parameter | Parameter | Type of parameter | Purpose | Example Value |
|---|---|---|---|---|
| | type | Type indicates the output repository type with following options supported -<br>1. FLATFILE<br>2. SCP<br>3. DBMS<br>4. KINESIS<br>5. KAFKA | | FLATFILE |
| | target | The value of target key may vary based on the type of output specified.<br>If it's a flat file then this field may indicate the fully qualified file name.<br>For SCP then it may indicate the fully qualified Unix path.<br>For DBMS it may indicate target table.<br>For KINESIS it may indicate target stream name<br>It can be MQTT/XMPP or AMPQ<br>scp user name | This field may be used make this framework as a real life real time cloud scale data simulator for IoT used by enterprises working in actual application development on IoT | /home/rtafadmin/data generated/combine.csv |
| | scppassword | scp password | | |
| Input | name | A logical name of this input block | Input block is generally required to specify the training data (based on a real source) and in accordance with the format specified in the parameter block.<br>If specified, this data may be read first by the application and based on the training it may generate a model to define the relationships between various parameters.<br>The generated model, after that, may be used to generate more set of data<br>In case there is an error in reading from the training data or generating the model, the application may simply give warning and proceed with actual logic specified in the parameter section. | |
| | type | Type indicates the input data source type with following options supported -<br>1. FLATFILE<br>2. SCP<br>3. DBMS<br>4. KINESIS<br>5. KAFKA<br>6. MQTT<br>7. AMPQ<br>8. XMPP | | |
| | target | Similar to target of output section, except data may be read this time. | | |
| | scpuser | | | |
| | scppassword | | | |
| SensorName | — | Simple Key Value | Specify sensor name (Useful if the configuration contains multiple configuration for multiple sensors) | |
| SensorType | — | | Specify sensor type [Optional] | |
| SensorId | — | | Specify sensor id [Optional] | |

TABLE 4-continued

Example YAML Configuration File format.

| Parent Parameter | Parameter | Type of parameter | Purpose | Example Value |
|---|---|---|---|---|
| Parameter | Types | Nested Key Value Pair - Key is the parameter name, value may be either FIXED or GENERATED | If the value is FIXED then in the following section the fixed value for this column has to be specified. If the value is GENERATED then in the following section the generation logic may be specified | |
| | Fixed | Nested key value pair - Each key identifies the column name Corresponding value may indicate the fixed value | | |
| | Generated | Nested key value pair - Each key identifies the column name Corresponding value may indicate the expression for generating the value | Following operators are possible + Addition (If not cast as per data text concatenation may be done) − Subtraction * Multiplication / Division % Modulus ^ exponent AVG average MEAN - MEAN value Following commands are possible RAND(20) - Generate any random integer from 0 to 20 RAND(5, 10) Generate any random integer from 5 to 10 RAND(DECIMAL(5), DECIMAL(10), 2) Generate any random floating point number from 5 to 10 with accuracy of 2 decimal places RAND("VALUEA", "VALUEB", "VALUEC") - Pick any random value between 3 fixed values RAND(COLUMNA) - Pick any random value from the parameter/data header type COLUMNA RAND(COLUMNA, COLUMNB, . . . ) Combine the values of the columns and pick a random between them DATERANGE("2005-01-01 00:00:00", "2015-12-31 23:59:59", "YYYY-MM-DD HH:MI:SS", "DD", 1) This may generate a time series of dates starting from 1st Jan. 2005 at midnight to 31st Dec., 2015 just before midnight and interval of generation interval may be 1 hour ADD(*, NUMBER(5)) | TEMPERATURE = COLUMN_A + number(10) This may generate temperature column value based on COLUMNA and adding digit 10 to the value HUMIDITY = RAND(DECIMAL(50), DECIMAL(80), 2) This may generate random humidity from 50% to 80% with accuracy of 2 decimal places. |

TABLE 4-continued

Example YAML Configuration File format.

| Parent Parameter | Parameter | Type of parameter | Purpose | Example Value |
|---|---|---|---|---|
| | | | Add numeric value 5 to the last generated value for this property | |
| | output | Specify the name of the output defined earlier. The configuration file may have defined multiple output with different types, if the generated data is required to be transported to multiple destinations then the corresponding output names may be specified here in comma separated format. | | output: flatfileoutput1, kinesisoutput1 |
| Training | | Specify the training block name defined previously. User can specify multiple training data using comma separated format | | Training: trainingset_flatfile1, trainingset_kinesis_test_stream |

Various fields shown above in Table 2 may be included or omitted in other formats.

One example scenario in which the data generation and response handling stack 100 may be implemented is within a plant growth monitoring system. Table 4 shows pseudo-code for an example configuration file for a plant growth monitoring system.

TABLE 5

Example configuration file for a plant growth monitoring system.

Output:
  - {name: sampleoutputlocation}
  - {type: FLATFILE}
  - {target: /home/rtafadmin/datagenerated/combine.csv}
Input:
  - {name: sample_training_data}
  - {type: FLATFILE}
  - {target: /home/rtafadmin/datagenerated/training.csv}
SensorName: Dendrometer
SensorType: DD_Type
SensorId: Dendrometer_0001
Parameter:
  Type:
    - {PLANTATION_TYPE: FIXED}
    - {PLANTATION_OWNER: FIXED}
    - {LATITUDE: FIXED}
    - {LONGITUDE: FIXED}
    - {SENSOR_ID: FIXED}
    - {TREENUM: GENERATED}
    - {DATETIME: GENERATED}
    - {SPECIES: GENERATED}
    - {DBH: GENERATED}
    - {BARK1: GENERATED}
    - {BARK2: GENERATED}
  Fixed:
    - {PLANTATION_TYPE: "FOREST"}
    - {PLANTATION_OWNER: "JOHN"}
    - {LATITUDE: "40.1721"}
    - {LONGITUDE: "-74.7821"}
    - {SENSOR_ID: "Dendrometer_0001"}

TABLE 5-continued

Example configuration file for a plant growth monitoring system.

Generated:
  - {TREENUM: RAND(1,99)}
  - {DATETIME: DATERANGE("2005-01-01 00:00:00", "2015-12-31 23:59:59","YYYY-MM-DD HH:MI:SS","DD",1)}
  - {SPECIES: RAND("PAPER_BIRCH", "BLACK_OAK", "RED_MAPLE", "CHESTNUT_OAK", "BALSAM_FIR")}
  - {DBH: ADD(*,(RAND(DECIMAL(5),DECIMAL(650),2))*0.0101)}
  - {BARK1: ADD(*,(RAND(DECIMAL(0),DECIMAL(30),2))*0.01)}
  - {BARK2: ADD(*,RAND(DECIMAL(0),DECIMAL(30),2))*0.02)}
Output: sampleoutputlocation
Training: sample_training_data Using the configuration file above, a system may generate substitute sensor data for plant growth variable, such as dendrometer data. A dendrometer is a device used in botany and agricultural sciences to measure the growth rate of various plants.

The system may identify variables using the configuration file above. The system may group or cluster the independent variables and specify correlation/metadata for each of these clusters The system may generate data for dependent variables based on the independent variables or other dependent variables. In some cases, to prevent over-precision the system may add noise/random factors to the generated data. Table 6 shows example plant growth variables.

TABLE 6

Example monitored plant growth variables.

| Variable Name | Type of variable | Dependency | How to specify |
|---|---|---|---|
| Species | Independent | — | Specify a collection of species |
| Geographic Location (Latitude, Longitude) | Independent | — | Specify a collection of locations or geo fences |
| Time | Independent | — | Specify the timescale and the rate in which it increases or decreases |
| Soil Humidity | Independent | — | Soil humidity can be thought as independent, however, to some degree this depends on the climate of the specific location. For example, if this is close to mountains with rate of downpour then humidity will increase. However, for simplicity we may consider it as independent. |
| Soil Salinity | Dependent | Geographic Location | Specify minimum and maximum levels and degree of correlation between geo location and soil salinity. More closely the geo location is toward sea/ocean it will have a positive correlation with salinity and vice versa. The geolocation can be grouped/classified/clustered into specific zones. For each zone the correlation between soil salinity and location would be specified. |
| BARK Width | Dependent | Species, Geographic Location, Time, Soil humidity and Soil Salinity | 1. The bark width increase would vary from tree species to species. 2. Tree growth would vary from geo location to location. 3. For some species (such as mangrove) growth is high in highly saline soil and for others it's completely opposite. 4. The growth of trees depends on time of the year. |

In this plant growth example scenario, the operator of the data generation and response handling stack specifies the variables and the relationships within the configuration file. However, in other systems, the relationships may be determined through machine learning.

As one example, Bark width may be expressed as: Bark Width (Y)=(Species*correlation with species)+(Geographic location*correlation with geo location)+(Time*correlation with time)+(Soil Humidity*correlation with soil humidity)+(Soil salinity*correlation with soil salinity)

For brevity, the following notation is used:

S = Species    T = Time          P = Precipitation
L = Location   SH = Soil Humidity   SS = Soil Salinity In addition, to prevent out-of-range values or unrealistic generated values, the operator may specify minimum and maximum values for the dependent variables.

In an example calculation below, data is generated for a year. The time-series data is divided into four clusters. The output dendrometer reading (DBH) may be expressed through correlation coefficients that relate the DBH output to the independent variables. The correlation coefficients may change for different ranges of the correlation coefficient. For example, the time variable may be most positively correlated with growth in the summer months and least in the winter months. The data ingestion logic 142 may cluster variables according to variation in correlation coefficients. Table 7 shows correlation coefficients for the different times of year for the time variable. The correlation coefficients are clustered into four groups.

TABLE 7

Correlation coefficients for the time variable versus DBH output.

| | Time(T) | | | |
|---|---|---|---|---|
| DBH (Y) | JAN-MAR | APR-JUN | JUL-SEP | OCT-DEC |
| $r_{yt}$ | 0.95 | 0.99 | 1 | 0.92 |

The output variable (DBH in this case) is dependent on each of the above factors and based on the above data system will calculate the combined correlation of DBH along with all the other variables. The notation $r_{ij}$ denotes a correlation coefficient between variables I and J. Accordingly, $r_{yp}$ is the correlation coefficient between DBH and precipitation and $r_{tp}$ is the correlation coefficient between time and precipitation.

The relationship between all the parameters/variables can be expressed $$R_{y,tp} = \sqrt{(r^2_{yt} + r^2_{yp} - 2r_{yt}r_{yp}r_{tp})/(1-r^2_{tp})} \quad \text{Equation 2}$$

$$DBH(Y) = xR + E \quad \text{Equation 3}$$

Where E is a random value/noise with, standard deviation $E=\sqrt{(1-R^2)}$, the mean of E=0, and E has no correlation with x.

Applying the generation technique used for DBH above, the data ingestion logic 142 may generate data for a year using example sampled sensor data from Table 8:

TABLE 8

Example sampled sensor data.

| SAMPLEDATE | MONTH_NUM | HUMIDITY | PRECIPITATION | DBH |
|---|---|---|---|---|
| Jan. 1, 2004 | 1 | 56.00 | 1.5 | 300 |
| Feb. 1, 2004 | 2 | 48.00 | 2.5 | 302 |
| Mar. 1, 2004 | 3 | 60.00 | 1.0 | 302.5 |
| Apr. 1, 2004 | 4 | 65.00 | 0.0 | 302.8 |
| May 1, 2004 | 5 | 70.00 | 0.5 | 303 |
| Jun. 1, 2004 | 6 | 80.00 | 2.0 | 303.1 |
| Jul. 1, 2004 | 7 | 85.00 | 4.6 | 304 |
| Aug. 1, 2004 | 8 | 86.00 | 3.5 | 305 |
| Sep. 1, 2004 | 9 | 70.00 | 2.1 | 305.8 |

TABLE 8-continued

Example sampled sensor data.

| SAMPLEDATE | MONTH_NUM | HUMIDITY | PRECIPITATION | DBH |
|---|---|---|---|---|
| Oct. 1, 2004 | 10 | 68.00 | 1.5 | 306 |
| Nov. 1, 2004 | 11 | 59.00 | 1.7 | 306.5 |
| Dec. 1, 2004 | 12 | 51.00 | 0.5 | 306.9 |

Using the sampled sensor data the data ingestion system may determine correlations using the 2004 data. Table 9 shows the determined coefficient relationships.

TABLE 9

Example determined relationship coefficients.

| | MONTH_NUM | HUMIDITY | PRECIPITATION | DBH | |
|---|---|---|---|---|---|
| MONTH_NUM | 1.000 | | | | Correlation for |
| HUMIDITY | 0.327 | 1.000 | | | JANUARY to |
| PRECIPITATION | −0.327 | −1.000 | 1.000 | | MARCH |
| DBH | 0.945 | 0.000 | 0.000 | 1.000 | |
| MONTH_NUM | 1.000 | | | | Correlation for |
| HUMIDITY | 0.982 | 1.000 | | | APRIL to |
| PRECIPITATION | 0.961 | 0.996 | 1.000 | | JUNE |
| DBH | 0.982 | 0.929 | 0.891 | 1.000 | |
| MONTH_ NUM | 1.000 | | | | Correlation for |
| HUMIDITY | −0.837 | 1.000 | | | JULY to |
| PRECIPITATION | −0.998 | 0.873 | 1.000 | | AUGUST |
| DBH | 0.998 | −0.800 | −0.991 | 1.000 | |
| MONTH_NUM | 1.000 | | | | Correlation for |
| HUMIDITY | −0.999 | 1.000 | | | SEPTEMBER to |
| PRECIPITATION | −0.778 | 0.756 | 1.000 | | DECEMBER |
| DBH | 0.998 | −1.000 | −0.736 | 1.000 | |

The example determined coefficient relationships may then be used to generate substitute DBH output for January 2005. For the example generation calculation, time=1/1/2005, which would be the 13th month in the series since 1/1/2004 was the first month.

Humidity (Weak Dependency on Time)

$\Delta Y = |[51-59]| = 8$ $\Delta X = \{0.327 * (13-12)\} = 0.327$ $H = (8 * 0.327) + 51 - (51-59) * 0.6[E_{random} = 0.6]$ 53.616+4.8

58.416

Precipitation (Weak Dependency on Time)

$\Delta Y = |10.5-1.71| = 1.2$ $\Delta X = \{-0.327 * (13-12)\} = -0.327$ $H = (-0.327 * 1.2) + 0.5 + (0.5-1.7) * 0.6[E_{random} = 0.6]$

−0.3924+0.5−0.72

−0.6124

In case, obtained value is less than the minimum allowed value for precipitation. Hence, the negative precipitation value may be replaced with a zero value.

For January to March:

$r_{ty} = 0.945$ $r_{hy} = 0$ $r_{py} = 0$

Therefore, in this example scenario, the generated value of DBH for January 2005 is:

$\Delta Y = |[Yn - Yn-1]| = 306.9 - 306.5 = 0.4$ $\Delta X = [\{0.945 * (13-12)\} + \{0 * (56.44-51)\} + \{0\}] = 0.07269$ $DBH = \{(0.945 * 0.4) + 306.9 + (306.9 - 306.5) * 0.6$

=307.278+0.24

=307.518(Generated)

Similarly, DBH for other portions of the year clusters may be calculated.

The above example relationships for the generation of DBH data are examples of static relationships. However, in other DBH scenarios, dynamic relationships may be used. For example, in place of the set correlation coefficients used in Table 7, dynamic correlation coefficient may have been calculated. For example, DBH output may be monitored by a dendrometer in a first region but unavailable in a second region of similar climate. In place of the set coefficients above the system may use regressions of the sampled dendrometer data in the first region to determine the analogs of the Table 7 coefficients. Using regressions of sampled data, including sampled data from another point in time or geographic region, in this matter is an example of dynamic relationship determination.

For hybrid relationships, the regression data and set Table 7 data may be combined. Hybrid relationships may be used where a plant growth may be estimated by set growth functions but can be improved to account for transient contributions, such as year-to-year temperature and humidity variance, through dynamic regression. Alternatively or additionally, hybrid relationships may be used where confidence in sampled data may be less than 100%. For example, when data from a region of similar climate is used in determination of a dynamic relationship, the data may not be fully representative of the region of interest. Accordingly, a static contribution may prevent statistically outlying dynamic relationship determinations from reducing DBH data generation accuracy.

In the DBH example, the DBH data may be used to coordinate planting and harvest timing for crops. Naturally, crops may continue to grow and do not necessarily fail where DBH data is unavailable. However, planting and harvest windows may be short and require significant logistical preparation to ensure crops are harvested, stored, and replanted. For example, storage may be coordinated with a wholesaler, but if the timing of the exchange is off by some number of weeks, crop spoilage may occur before emergency arrangements can be made.

In addition, equipment to support planting and harvest may be leased or temporarily requisitioned. Narrowing the period over which requisition may be needed, e.g., by improving estimates of harvest/planting windows, may reduce costs and allow for greater utilization of equipment.

Another example scenario in which the data generation and response handling stack may be applied is automotive performance monitoring.

In the example scenario the following variable may be used:
Variables that may be generated:
Velocity of the car in km/h
Acceleration in m/s$^2$
Generated engine heat
Independent variables:
Engine capacity
Road type (in a scale from 1 to 5, 1 being worst and 5 is best)
Precipitation
Elapsed time The calculations may include variables at different calculation levels. For example, velocity may be a second level dependent variable because it may depend on acceleration which may be dependent on independent variables elapsed time, engine capacity, road type, precipitation.

Table 10 shows example data taken for a particular driver and automobile.

TABLE 10

Example sampled automotive performance sensor data.

| Elapsed Time (seconds) T | Engine Capacity (cc) C | Road Type (1-5) X | Precipitation amount (cm) P | Acceleration (m/s$^2$) A | Velocity (Km/hour) V | Engine Heat (Degree Celsius) H |
|---|---|---|---|---|---|---|
| 5 | 1200 | 3 | 0 | 2 | 10 | 25 |
| 10 | 1200 | 3 | 0 | 4 | 20 | 28 |
| 20 | 1200 | 3 | 0 | 4 | 40 | 28 |
| 30 | 1200 | 3 | 0 | 5 | 52 | 32 |
| 40 | 1200 | 3 | 0 | 0 | 65 | 35 |
| 50 | 1200 | 3 | 0 | 0 | 60 | 35 |
| 60 | 1200 | 3 | 0 | −2 | 55 | 35 |
| 80 | 1200 | 3 | 0 | 0 | 52 | 35 |
| 100 | 1200 | 3 | 0 | −4 | 30 | 34 |
| 120 | 1200 | 3 | 0 | −8 | 10 | 34 |
| 140 | 1200 | 3 | 0 | 0 | 0 | 33 |

If the above data is presented to the data generation and response handling stack, the data ingestion logic may determine:
Relationship between time and acceleration ($r_{ta}$)
Relationship between engine capacity and acceleration ($r_{ca}$)
Relationship between road type and acceleration ($r_{xa}$)
Relationship between precipitation and acceleration ($r_{pa}$)

For the example sampled data above, $r_{ta}$ is positive for the first half of the elapsed period and negative for the second half. In the example sampled data, the car accelerates and then decelerates.

The coefficients $r_{ca}$, $r_{xa}$, and $r_{pa}$ are zero because these variables are constant for this example data set. Therefore, A at time T=$(r_{ta})$*(T)+randomized noise value. For V, V=$(r_{av})$*(A)+randomized noise value. Also, engine heat may be represented based on V, as H=$(r_{vh})$*(V)+randomized noise value.

The determination of the relationships above for the automobile and driver is an example of dynamic relationship determination. The data is sampled and then a relationship is determined. The determined relationships may be used for later data generation. Additionally or alternatively, static relationships, e.g., between acceleration and other variables or vice versa, may be used. Accordingly, rather than determining a dynamic relationship between velocity and time or velocity an acceleration, the known analytic relationship between velocity and acceleration may be used to generate velocity data from sampled acceleration data.

In various scenarios, such automotive data generation may be used where various data types may not be available. For example, a speedometer on an automobile may become damaged. In some cases, an operator may be able to safely continue responsible operation of the automobile if velocity data can be generated, e.g., from available accelerometers and clocks, or other available data. Similarly, engine heat levels may be generated when a thermal sensor becomes inoperative. In some cases, operating an automobile without velocity or engine heat data may lead to damage to the automobile.

In cases where the coefficients are provided by a configuration file at the configuration layer, some analysis prior to data generation may be forgone in the supervised/manual or mixed modes.

The above described example scenarios are two examples systems in which the data generation and response handling stack may be applied to generate sensor data. However, the data generation and response handling stack may be used by operators in other data generation scenarios. For example, the data generation and response handling stack may be used in public utility monitoring and management systems such as those used in water districts and power plants. The data generation and response handling stack may be used in home security and environmental control. For example, the data generation and response handling stack may be used to determine entry to a home for security purposes using monitored temperature data from a thermostat to replace unavailable entry sensors. The data generation and response handling stack may be used to replace sensor data in virtually any multi-sensor environment.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A device comprising:
a network interface configured to:
access first-type sensor circuitry configured to provide first-type sensor data;
receive a request, from processing circuitry, for second-type sensor data from second-type sensor circuitry, the second-type sensor data different from the first-type sensor data; and
provide substitute sensor data instead of the second-type sensor data to the processing circuitry; and
data generation circuitry in data communication with the network interface, the data generation circuitry configured to execute a data generation stack comprising:
a configuration layer comprising a configuration file configured to structurally relate the first-type sensor data to the second-type sensor data via a static relationship;
a data ingestion layer configured to:
access the configuration file to determine whether the second-type sensor data includes a fixed data type or a generated data type before sampling the first-type sensor data, the fixed data type being hardware sensor data for which substitution through data generation is disallowed;
responsive to the second-type sensor data including a generated data type, sample the first-type sensor data from the first-type sensor circuitry;
responsive to sampling the first-type sensor data, obtain a dynamic relationship between the first-type sensor data and second-type sensor data;
determine a hybrid relationship based on the static and dynamic relationships, where the hybrid relationship relates the first-type sensor data to the second type sensor data, to facilitate generation of the second-type sensor data, and where the hybrid relationship reflects a balance between the static and dynamic relationships, the balance being determined by comparison with reverse generated data; and
responsive to the hybrid relationship and the first-type sensor data, generate the substitute data for the second-type sensor data; and
a data export layer configured to:
determine that the second-type sensor circuitry is unavailable; and
responsive to the request, cause the network interface to provide the substitute sensor data instead of the second-type sensor data to the processing circuitry.

2. The device of claim 1, where the data export layer is configured to determine that the second-type sensor circuitry is unavailable during a power interruption of the second-type sensor circuitry.

3. The device of claim 1, where the data ingestion layer is configured to test the hybrid relationship through reverse generation of test data that is compared to previously sampled second-type sensor data.

4. The device of claim 1, where:
the first-type sensor data comprises geolocation data; and
the second-type sensor data comprises soil salinity data.

5. The device of claim 1, where the hybrid relationship relates multiple types of sensor data, including the first-type sensor data, to facilitate generation of the second-type sensor data.

6. The device of claim 5, where:
the multiple types of sensor data comprise geolocation data, plant species data, time data, soil humidity data, or any combination thereof; and
the second-type sensor data comprises dendrometer data.

7. The device of claim 5, where:
the multiple types of sensor data comprise engine capacity data, road condition data, precipitation data, time data, or any combination thereof; and
the second-type sensor data comprises acceleration data, engine heat data, velocity data, or any combination thereof.

8. The device of claim 1, where the configuration file is configured to specify the static relationship via a predefined mathematical relation between the first-type sensor data and the second-type sensor data.

9. The device of claim 1, where the data ingestion layer is configured to derive the dynamic relationship via a regression performed responsive to sampling the first-type sensor data.

10. The device of claim 1, where the data export layer is configured to:
   determine an output format for the substitute sensor data; and
   access a format driver to facilitate formatting the substitute sensor data in accord with the output format.

11. The device of claim 10, where the data export layer is configured to format the substitute sensor data in accord with the output format by generating a flat file, streaming the substitute data, pushing the substitute data to an edge device, providing access to the substitute data as a web service, populating a relational database with the substitute data, or any combination thereof.

12. A method comprising:
   determining a static relationship between first-type sensor data and second-type sensor data by accessing a configuration file managed by a configuration layer of a data generation stack executing on data generation circuitry;
   accessing, at a data ingestion layer of the data generation stack, the configuration file to determine whether the second-type sensor data includes a fixed data type or a generated data type before obtaining a sample of the first-type sensor data, the fixed data type being hardware sensor data for which substitution through data generation is disallowed;
   responsive to the second-type sensor data including a generated data type, obtaining, from first-type sensor circuitry, a sample of the first-type sensor data;
   responsive to the sample, determining a dynamic relationship between the first-type sensor data and second-type sensor data;
   based on the static and dynamic relationships, determining, at the data ingestion layer of the data generation stack, a hybrid relationship between the first-type sensor data and the second-type sensor data, where the hybrid relationship relates the first-type sensor data to the second type sensor data, to facilitate generation of the second-type sensor data, and where the hybrid relationship reflects a balance between the static and dynamic relationships, the balance being determined by comparison with reverse generated data;
   receiving, at a data export layer of the data generation stack, a request for the second-type sensor data provided by second-type sensor circuitry;
   determining that the second-type sensor circuitry is unavailable to provide the second-type sensor data;
   responsive to the first-type sensor data and the hybrid relationship, generating, at the data ingestion layer, substitute data; and
   causing the data export layer to respond to the request by providing the substitute data instead of the second-type sensor data.

13. The method of claim 12, where determining the hybrid relationship comprising relating multiple types of sensor data, including the first-type sensor data, to facilitate generation of the second-type sensor data.

14. The method of claim 12, further comprising:
   determining, at the data export layer, an output format for the substitute data; and
   accessing a format driver to facilitate formatting the substitute data in accord with the output format.

15. The method of claim 14, where formatting the substitute data in accord with the output format comprises: generating a flat file, streaming the substitute data, pushing the substitute data to an edge device, providing access to the substitute data as a web service, populating a relational database with the substitute data, or any combination thereof.

16. A product comprising:
   a machine-readable medium other than a transitory signal;
   instructions stored on the machine-readable medium, the instructions configured to, when executed, cause circuitry to:
      determine a static relationship between first-type sensor data and second-type sensor data by accessing a configuration file managed by a configuration layer of a data generation stack executing on data generation circuitry;
      access, at a data ingestion layer of the data generation stack, the configuration file to determine whether the second-type sensor data includes a fixed data type or a generated data type before obtaining a sample of the first-type sensor data, the fixed data type being hardware sensor data for which substitution through data generation is disallowed;
      responsive to the second-type sensor data including a generated data type, obtain, from first-type sensor circuitry, a sample of the first-type sensor data;
      responsive to the sample, determine a dynamic relationship between the first-type sensor data and second-type sensor data;
      based on the static and dynamic relationships, determine, at the data ingestion layer of the data generation stack, a hybrid relationship between the first-type sensor data and the second-type sensor data, where the hybrid relationship relates the first-type sensor data to the second type sensor data, to facilitate generation of the second-type sensor data, and where the hybrid relationship reflects a balance between the static and dynamic relationships, the balance being determined by comparison with reverse generated data;
      receive, at a data export layer of the data generation stack, a request for the second-type sensor data provided by second-type sensor circuitry;
      determine that the second-type sensor circuitry is unavailable to provide the second-type sensor data;
      responsive to the first-type sensor data and the hybrid relationship, generate, at the data ingestion layer, substitute data; and
      cause the data export layer to respond to the request by providing the substitute data instead of the second-type sensor data.

17. The product of claim 16, where the instructions are further configured to configured to determine that the second-type sensor circuitry is unavailable during a power interruption of the second-type sensor circuitry.

18. The product of claim 16, where the instructions are further configured to cause the circuitry to test the hybrid relationship through reverse generation of test data that is compared to previously sampled second-type sensor data.

19. The product of claim 16, where the data ingestion layer is configured to derive the dynamic relationship via a regression performed responsive to obtaining a sample of the first-type sensor data.

20. The product of claim 16, where the data export layer is configured to:
   determine an output format for the substitute data; and
   access a format driver to facilitate formatting the substitute data in accord with the output format.

\* \* \* \* \*